United States Patent
Barkie et al.

(10) Patent No.: US 9,100,398 B2
(45) Date of Patent: *Aug. 4, 2015

(54) ENHANCING DIRECTORY SERVICE AUTHENTICATION AND AUTHORIZATION USING CONTEXTUAL INFORMATION

(71) Applicant: International Business Machines Corporation, Armonk, NY (US)

(72) Inventors: Eric J. Barkie, Cary, NC (US); Benjamin L. Fletcher, Elmsford, NY (US); Colm Malone, New York, NY (US); Andrew P. Wyskida, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 263 days.

This patent is subject to a terminal disclaimer.

(21) Appl. No.: 13/743,313

(22) Filed: Jan. 16, 2013

(65) Prior Publication Data
US 2014/0201813 A1 Jul. 17, 2014

(51) Int. Cl.
*H04L 29/06* (2006.01)
*H04L 29/12* (2006.01)

(52) U.S. Cl.
CPC ............ *H04L 63/0892* (2013.01); *H04L 63/10* (2013.01); *H04L 63/107* (2013.01); *H04L 61/1523* (2013.01); *H04L 63/0236* (2013.01)

(58) Field of Classification Search
None
See application file for complete search history.

(56) References Cited

U.S. PATENT DOCUMENTS

| | | |
|---|---|---|
| 6,286,104 B1 | 9/2001 | Buhle et al. |
| 6,654,891 B1 | 11/2003 | Borsato et al. |
| 6,732,160 B2 | 5/2004 | Ambrosini et al. |
| 6,804,777 B2 | 10/2004 | Hollis et al. |
| 7,281,139 B2 | 10/2007 | Stewart |
| 7,665,132 B2 | 2/2010 | Hisada et al. |
| 7,734,611 B2 * | 6/2010 | Rowley et al. ............... 707/706 |
| 7,827,609 B2 | 11/2010 | Hong et al. |
| 7,945,946 B2 * | 5/2011 | Rowley ........................... 726/4 |
| 7,984,482 B1 | 7/2011 | Cannata et al. |
| 8,036,211 B1 | 10/2011 | Leeder et al. |
| 8,046,585 B2 | 10/2011 | Parkinson |
| 8,095,786 B1 | 1/2012 | Kshirsagar et al. |
| 8,126,916 B2 | 2/2012 | Bauman et al. |
| 8,127,350 B2 | 2/2012 | Wei et al. |
| 8,145,616 B2 | 3/2012 | Rowley |
| 8,286,002 B2 | 10/2012 | Kamat et al. |
| 8,332,493 B2 | 12/2012 | Rowley et al. |
| 8,489,761 B2 | 7/2013 | Pope et al. |
| 8,539,567 B1 * | 9/2013 | Logue et al. ...................... 726/7 |
| 8,627,410 B2 * | 1/2014 | Hughes et al. .................... 726/3 |
| 2002/0144144 A1 | 10/2002 | Weiss et al. |
| 2003/0074372 A1 * | 4/2003 | Barchi et al. ............... 707/104.1 |

(Continued)

OTHER PUBLICATIONS

Cisco, "PIX/ASA: Mapping VPN Clients to VPN Group Policies Through LDAP Configuration Example," Cisco Systems Incorporation, Document ID 91831, Jul. 2007, pp. 1-10.

(Continued)

*Primary Examiner* — Michael R Vaughan
(74) *Attorney, Agent, or Firm* — Louis J. Percello; Ryan, Mason & Lewis, LLP

(57) ABSTRACT

Systems and methods are provided for authenticating and authorizing network access requests using directory services in which the directory service authentication and authorization procedures are enhanced using contextual information.

30 Claims, 5 Drawing Sheets

(56) References Cited

U.S. PATENT DOCUMENTS

| | | | |
|---|---|---|---|
| 2004/0255164 A1 | 12/2004 | Wesemann | |
| 2005/0216485 A1* | 9/2005 | Bell et al. | 707/100 |
| 2006/0236369 A1* | 10/2006 | Covington et al. | 726/1 |
| 2007/0106699 A1* | 5/2007 | Harvey et al. | 707/200 |
| 2008/0034413 A1 | 2/2008 | He et al. | |
| 2008/0046993 A1* | 2/2008 | Mullick et al. | 726/15 |
| 2008/0144625 A1 | 6/2008 | Wu et al. | |
| 2009/0019533 A1 | 1/2009 | Hazlewood et al. | |
| 2009/0210541 A1 | 8/2009 | Chandolu et al. | |
| 2009/0234953 A1 | 9/2009 | Braslavsky | |
| 2010/0100949 A1* | 4/2010 | Sonwane et al. | 726/7 |
| 2011/0058562 A1* | 3/2011 | McCoy et al. | 370/401 |
| 2012/0072975 A1 | 3/2012 | Labrador et al. | |
| 2013/0198368 A1* | 8/2013 | Patterson et al. | 709/224 |
| 2013/0226689 A1* | 8/2013 | Nemitz et al. | 705/14.41 |
| 2013/0254849 A1* | 9/2013 | Alison et al. | 726/4 |
| 2013/0286983 A1* | 10/2013 | Hu | 370/329 |
| 2014/0359710 A1* | 12/2014 | Chaput | 726/4 |

OTHER PUBLICATIONS

M.A. Qadeer et al., "Profile Management and Authentication Using LDAP," IEEE International Conference on Computer Engineering and Technology (ICCET), Jan. 2009, pp. 247-251, vol. 2.

M. Salim et al., "Data Retrieval and Security Using Lightweight Directory Access Protocol," IEEE 2nd International Workshop on Knowledge Discovery and Data Mining (WKDD), Jan. 2009, pp. 685-688.

http://openvpn.net/Index.php/open-source/downloads.html, Apr. 26, 2011, 2 pages.

* cited by examiner

ENHANCING DIRECTORY SERVICE AUTHENTICATION AND AUTHORIZATION USING CONTEXTUAL INFORMATION

CROSS-REFERENCE TO RELATED APPLICATIONS

This application is related to U.S. patent application Ser. No. 13/743,265, filed concurrently herewith and U.S. patent application Ser. No. 13/095,437, filed Apr. 27, 2011, the disclosures of which are incorporated herein by reference.

TECHNICAL FIELD

This disclosure relates generally to systems and methods for authenticating and authorizing network access requests and, in particular, to systems and methods for enhancing directory service authentication and authorization procedures using contextual information.

BACKGROUND

Various protocols such as LDAP (Lightweight Directory Access Protocol) are utilized to access directory information. LDAP is commonly used as an authentication and authorization service to access public data and private data. In general, data access controls are determined by an identity of a user that is attempting to access an LDAP service. Public data can be accessed and searched by anyone via an "anonymous" LDAP BIND, whereas private data can only be accessed if the user is authenticated. More specifically, in an LDAP system, an authentication process to verify a user's identity is performed via a "user" LDAP BIND process, whereby the user transmits credentials that are used to identify the user. A user's credentials typically include a user ID and password. During the LDAP BIND process, the user specifies a unique object within the LDAP database known as a "distinguished name" to "bind" to. Once the user has been authenticated via the LDAP BIND process with a distinguished name, this is the identity that LDAP uses to determine data access controls.

More specifically, to authenticate a user via LDAP, a first step involves finding a user object that represents the user within an LDAP database. An anonymous LDAP BIND is performed, followed by an LDAP SEARCH to find any user object with a matching ID attribute to that of the user's ID. If the user object is found, the distinguished name that is returned is used in the subsequent LDAP BIND to verify the user's password credentials. Once the user's credentials have been verified, the user's private LDAP object is available for inspection. The LDAP metadata of the user can then be utilized to make various authorization-type decisions such as whether the user is active or a member of a valid group, etc. A drawback of LDAP is that the LDAP service draws on relatively static data stored in its native database, whereby the user information can be out of date.

SUMMARY

Embodiments of the invention generally include systems and methods for authenticating and authorizing network access requests and, in particular, to systems and methods for enhancing directory service authentication and authorization procedures using contextual information.

In one embodiment of the invention, a method is provided by a gateway server for controlling access to a network. An access request is received from a client application running on a computing device for accessing a remote network. The access request includes contextual information for use in authorizing access to the remote network, wherein the contextual information includes contextual information about a user, the computing device and the client application requesting access to the remote network. An authorization query is submitted to a directory server, wherein the authorization query includes the contextual information contained in the access request received from the client application. An authorization result is received from the directory server in response to the authorization query. The authorization result is dynamically generated in real-time by the directory server based on the contextual information. The authorization result includes a connection object having one or more connection rules for establishing a network connection between the client application and the remote network. The connection rules are applied to establish a network connection between the client application and the remote network.

In another embodiment of the invention, a method is provided by a directory server for controlling access to a network. An authorization query is received from a gateway server, wherein the authorization query includes contextual information contained in an access request received by the gateway server from a client application running on a computing device. The contextual information includes contextual information about a user, the computing device and the client application requesting access to a remote network. An authorization process is performed by evaluating the contextual information contained in the authorization query using one or more network connection rules. An authorization result is dynamically generated in real-time based on results of the evaluation of the contextual information, wherein the authorization result includes a connection object having one or more connection rules for establishing a network connection between the client application and the remote network. The authorization result is sent to the gateway sever as a response to the authorization query.

Other embodiments of the invention will become apparent from the following detailed description, which is to be read in conjunction with the accompanying drawings.

DETAILED DESCRIPTION

Figure 1:
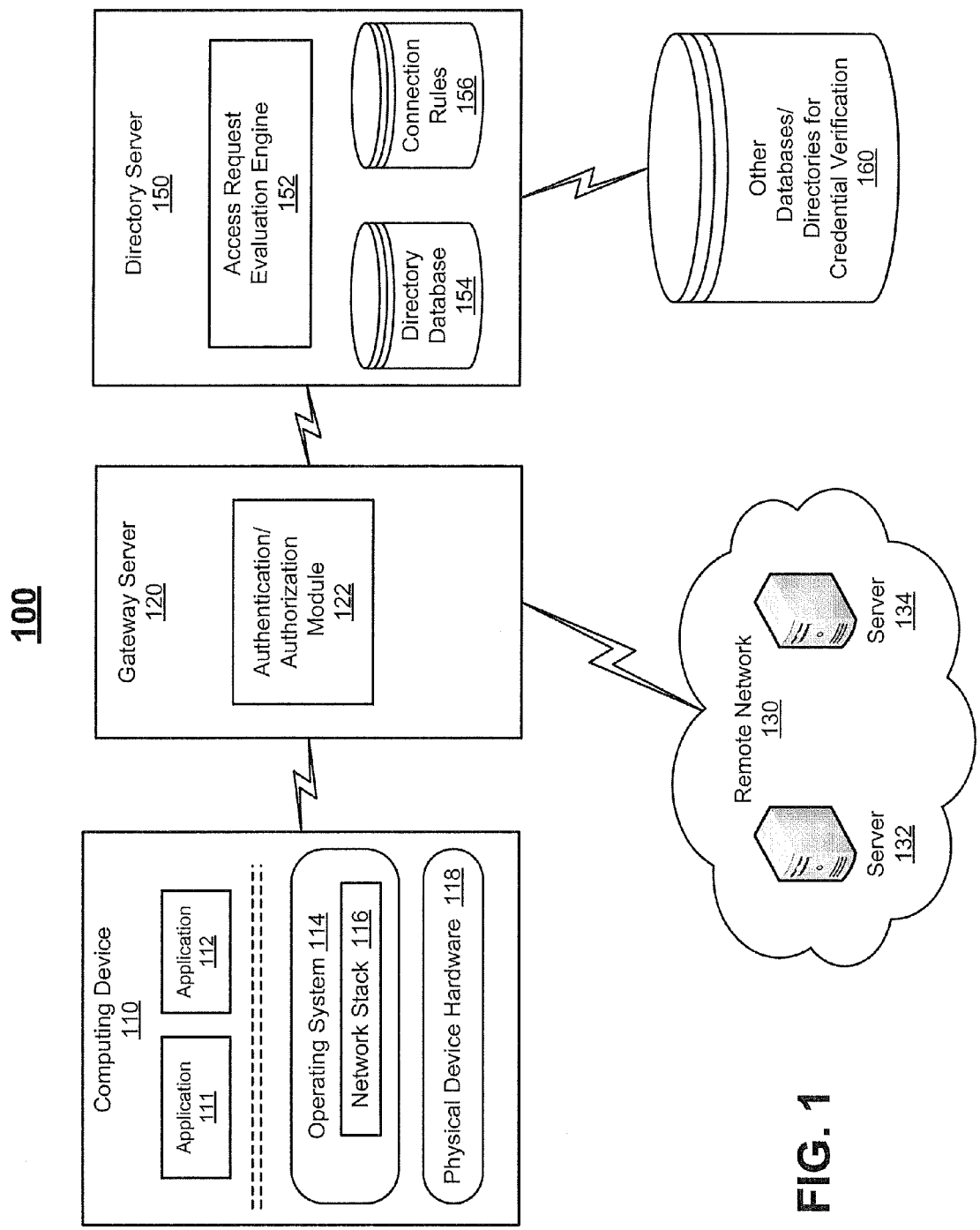
FIG. 1 is a block diagram of a system for authenticating and authorizing network access requests according to an embodiment of the invention.

Embodiments of the invention will now be discussed in further detail with regard to systems and methods for authenticating and authorizing network access requests in using directory services in which the directory service authentication and authorization procedures are enhanced using contextual information. For example, FIG. 1 is a block diagram of a system for authenticating and authorizing network access requests according to an embodiment of the invention. In general, a system 100 shown in FIG. 1 comprises a computing device 110, a gateway server 120, a remote network 130, a directory server 150 and other network accessible databases or directories 160. The computing device 110 comprises a plurality of applications 111 and 112 that execute in user space, an operating system 114, a network communications stack 116 (e.g., TCP/IP) that operates in kernel space, and physical device hardware 118 controlled by the operating system 114. The computing device 110 may be a laptop computer, mobile phone, etc. The gateway server 120 comprises an authentication and authorization module 122. The remote network 130 (e.g., intranet) comprises a plurality of servers 132 and 134 that implement an application or service that is accessed by one or more applications 111 and 112 running on the computing device 110. The directory server 150 comprises an access request evaluation engine 152, a directory database 154, and network connection rules 156.

In the system of FIG. 1, the computing device 110 sends network access requests to the gateway server 120 requesting access to the remote network 130. The gateway server 120 controls access to the remote network 130 using the authentication and authorization module 122. The gateway server 120 receives an access request from a client application 111 or 112 running on the computing device 110 for accessing a remote network. The access request comprises contextual information for authenticating and authorizing access to the remote network 130. As explained in further detail below with reference to FIG. 3, for example, the contextual information comprises contextual information about a user, the computing device 110, or the client application requesting access to the remote network 130, or a combination thereof.

The authentication and authorization module 122 of the gateway server 120 is configured to submit an authorization query to the directory server 150 in response to an access request received by a client application 111 or 112 running on the computing device 110. The authorization query comprises contextual information contained in the access request received from the client application 111 or 112. The authentication and authorization module 122 of the gateway server 120 is configured to receive an authorization result from the directory server 150 in response to the authorization query. The authorization result is dynamically generated in real-time by the directory server 150 based on the contextual information contained in the authorization query. As explained in further detail below with reference to FIG. 4, for example, the authorization result comprises a connection object comprising one or more connection rules for establishing a network connection between the remote network 130 and a client application 111 or 112 running on the computing device 110. The authentication and authorization module 122 of the gateway server 120 is configured to process the authorization result from the directory server 150 and apply the connection rule(s) to establish a network connection between the client application 111 or 112 and the remote network 130.

In one embodiment of the invention, the directory server 150 performs an authentication process and an authorization process based on contextual information contained in the authorization query received from the gateway server 120. In particular, the access request evaluation engine 152 processes contextual information contained in the received authorization query against directory information contained in the directory database 154 of the directory server 150 to authenticate an identity of an "endpoint." An endpoint can be the user, the computing device, a client application, or a combination thereof. Furthermore, the access request evaluation engine 152 processes contextual information contained in the received authorization query against connection rules 156 to dynamically determine one or more connection rules that are authorized to be applied to establishing a network connection between the remote network 130 and an application 111 or 112 running on the computing device 110. Based on the results of the authentication and authorization, the directory server 150 dynamically generates an authorization result in real-time, and sends the authorization result to the gateway sever 120 as a response to the authorization query. As noted above, the authorization result comprises a connection object comprising one or more connection rules for establishing a network connection between a client application 111 or 112 and the remote network 130.

In one embodiment of the invention, the directory server 150 is an LDAP server providing an LDAP authentication and authorization service to access public data and private data stored in the directory database 154. In this embodiment, the access request evaluation engine 152 is an LDAP plugin that integrates with a standard LDAP service to provide enhanced authentication and authorization protocols as described herein. As noted above, a standard LDAP service draws on static data stored in the native directory database 154. In one embodiment of the invention, the access request evaluation engine 152 intercepts client LDAP BIND and SEARCH requests to create a virtual and flexible namespace that can draw on multiple LDAP and non-LDAP sources. This virtual and flexible namespace allows a conventional user credential that uniquely identifies a single person, to be combined with other dynamic user-related attributes such as, for example, user device security posture, active employee status, etc. for purposes of authenticating/verifying the identity of the user.

The access request evaluation engine 152 creates a virtual namespace by intercepting all client LDAP BIND and SEARCH requests that occur on a particular distinguished name prefix. The prefix is used so that the LDAP service can still function in a standard manner, but when special client consideration is needed, the distinguished name prefix may be used to trigger the plug-in logic of the access request evaluation engine 152. Based on the user credentials that are passed, special consideration can be taken by the plugin on certain user ID input formats.

For example, the ID bib@ibm.com@android can be used to indicate not only a user's ID (i.e., bib@ibm.com) but also the device (android smart phone) that the user being utilized by the user to authenticate. Furthermore, before searching a native LDAP directory for the user ID bib@ibm.com, which may have a legitimate entry in the native LDAP directory, the employee status can be cross-referenced against a human resources database to ensure an active employee status, and if not, access can be denied. The credential verification can also be out-source to any number of local or external sources, and any set of configurable policies can be enforced (e.g. too many bad passwords in a given time period etc.). Finally if, for example, the user ID, client posture, and employee posture are all valid, the configurable LDAP plugin may return just the user record, or an enhanced version of the record. An enhance LDAP record could include any number of dynamic virtual attributes gathered from various cross-referencing data sources used to validate the user's identity in the first instance, wherein the additional (secondary) user metadata could be retrieved dynamically from other non-LDAP sources during an LDAP authentication/authorization process.

Figure 2:
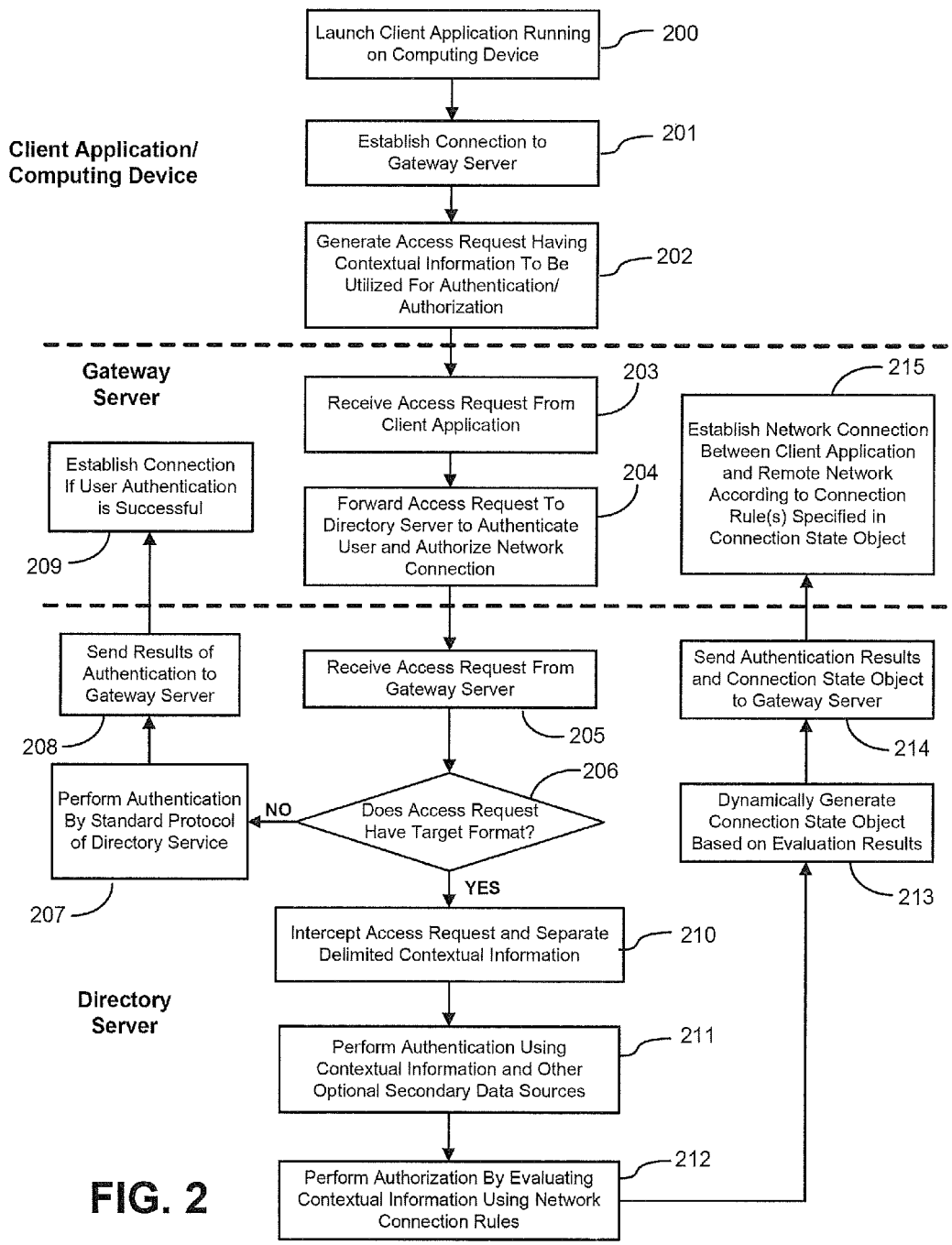
FIG. 2 is a flow diagram of a method for authenticating and authorizing network access requests according to an embodiment of the invention.

FIG. 2 is a flow diagram of a method for authenticating and authorizing network access requests according to an embodiment of the invention. In one embodiment of the invention, FIG. 2 illustrates methods that are implemented by the computing device 110, gateway sever 120, and the directory server 150 of FIG. 1 for authenticating and authorizing a network access request. As such, for illustrative purposes, the flow diagram of FIG. 2 will be discussed in the context of the system 100 of FIG. 1. A method for authenticating and authorizing a network access request as shown in FIG. 2 begins with various steps (200, 201 and 202) performed by the computing device 110 and/or a client application 111 or 112. Initially, a user launches one of the client applications 111, 112 running on the computing device 110 (step 200). Assuming the client application needs access to the remote network 130, a connection will be established to the gateway server 120 (step 201). This connection can be a TCP/IP connection (or other type of network connection) that is established using the network stack 116 operating within kernel space under the control of the device operating system 114 (see FIG. 1).

Once the network connection is established, an access request is generated and sent to the gateway server (step 202). The access request comprises contextual information about the user, the computing device and/or the client application, which is used to authenticate and authorize the access request. For instance, the contextual information about the user may include a username and a user password. The contextual information about the user may include a role of the user (e.g., administrator, user, application owner, etc.). Further, the contextual information about the client application may include an application identifier, wherein the identifier can identify an application type of the client application (e.g., e-mail client, instant messaging client application, etc.). The contextual information about the computing device may include a device identifier that identifies a device type of the computing device, or information regarding an operating system of the computing device, or location information regarding a location of the computing device. In other embodiments, the contextual information of an access request may include connection information regarding type of network connection, or information regarding a date or time of day, or both, of the access request.

Figure 3:
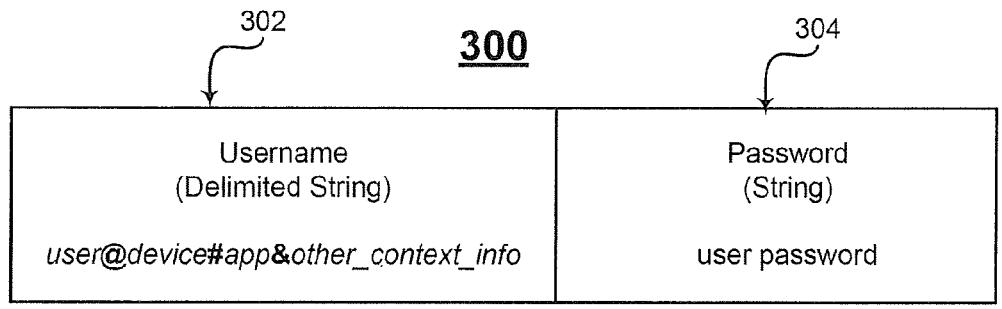
FIG. 3 shows a data structure of a network access request according to an embodiment of the invention.

In one embodiment of the invention, the contextual information of an access requested can be encoded using a data structure as shown in FIG. 3. In particular, FIG. 3 illustrates a data structure 300 of a VPN access request according to an embodiment of the invention. The data structure comprises a first data block 302 and a second data block 304. The first data block 302 comprises a username in the form of a delimited string which includes contextual information about the user (user), the device (device), the client application (app), and other contextual information (other_context_info). The different types of contextual information are appended to each other and separated by unique delimiters. For, instance, the user contextual information (user) may be a user ID, which is separated from the device contextual information (device) by the "@" character. The client application contextual information (app) is separated from the device contextual information (device) by the "#" character. Additional contextual information (other_context_info) is separated from the client application contextual information (app) by the "&" character. The additional contextual information (other_context_info) may include one or multiple additional types of contextual information as discussed above, which are separated by unique delimiters. Other types of delimiting characters may be used to separate different types of contextual information appended to each other in the username string of the first data block 302 shown in FIG. 3, for example. The second data block 304 includes a user password.

Referring again to FIG. 2, the gateway server 120 will receive the network access request sent from the client application (or computing device) over the network connection (step 203). The gateway sever 120 will submit an authorization query to the directory server 150, wherein the authorization query comprises contextual information contained in the access request (step 204). In one embodiment, the gateway server 120 may simply forward the access request to the directory server 150. The directory server 150 will perform an authentication and authorization process using the contextual information contained in the access request.

In particular, when the directory server 150 receives an access request from the gateway server 120 (step 205), the directory server 150 will determine whether or not the access request is of a particular type or otherwise has a target format (step 206). For instance, in one embodiment of the invention, the access request evaluation engine 152 will determine if the access request has a data format such as shown in FIG. 3 which is different from a standard query format of the directory server 150, or otherwise whether the access request contains a plurality of different types of fine-grained contextual information as discussed above. If it is determined that the access request does not have a unique target format (negative determination in step 206), the access request will be authenticated using a standard protocol of the directory service (step 207). For instance, in one embodiment where the directory server 150 is an LDAP server, a standard LDAP query will be processed using BIND and SEARCH protocols, as is known in the art. For instance, a BIND process will be performed by using a user ID to authenticate the identity of a user against user ID information in the native LDAP directory, followed by a SEARCH process to access static records of the verified user to determine if the user is authorized to access the remote network based on information contained in access control lists. The accessed data records are processed against associated access control lists using known techniques to determine if the user is authorized to access the remote network. The results of the standard authentication/authorization will be sent to the gateway server (step 208), and the requested network connection will be established by the gateway server, if the user authentication is successful (step 209).

On the other hand, if it is determined that the access request does have a unique target format (affirmative determination in step 206), then the access request will be intercepted by the access request evaluation engine 152 and processed to separate out the different types of contextual information contained in the access request (step 210). In an LDAP environment, the evaluation logic of the access request evaluation engine 152 will be triggered to process the access request, thereby overriding the standard LDAP BIND and SEARCH queries.

The access request evaluation engine 152 will then perform an authentication process to authenticate a target endpoint using the contextual information of the access request and other optional data obtained from secondary data sources (step 211). For instance, a target endpoint can be the user, the computing device, a client application, or a combination thereof. In particular, a user can be authenticated using contextual information such as a user ID contained in the access request. The computing device (which was used to submit the access request) can be authenticated using device contextual information such as a device ID contained in the access request. The client application can be authenticated using application contextual information such as an application ID contained in the access request. In other embodiments, the authentication may include verifying both a user ID and a device ID associated with the user and computing device seeking access to the remote network, or verifying both a user ID and application ID of the user and application seeking access to the remote network, etc.

In another embodiment of the invention, an authentication process may be augmented by the directory server 150 accessing other local or remote databases or directories 160 (FIG. 1) to obtain additional data for verifying the credentials of the user, device and/or client application seeking access to the remote network. For instance, as noted above, for user authentication of an employee, an employee status can be cross referenced against a human resources database to ensure an active employee status of an individual who otherwise has a valid user ID in the directory database 154 of the directory server 150. This optional credential verification process can also be out-sourced to any number of local or external sources, and any set of configurable policies can be enforced.

Following authentication, the access request evaluation engine 152 performs an authorization process by evaluating the contextual information against one or more connection rules that are persistently stored in a database 156 of the directory server 150. In one embodiment of the invention, the connection rules 156 are maintained in a truth table type folinat which specifies conditions and rules under which network connections to the remote network 130 can be established, based on different types of contextual information contained in a given access request. For instance, the connection rules may specify that a given type of user can access the remote network using a given type of computing device for a given type of application. Moreover, the connection rules may specify further conditions with regard to date and time of day, etc., for authorizing access to the remote network.

The access request evaluation engine 152 will process the contextual information against the connection rules 156 and dynamically generate an authorization result in real-time based on results of the evaluation of the contextual information (step 213). In one embodiment of the invention, the authorization result comprises a connection state object having one or more connection rules for establishing a network connection between the client application and the remote network, which are determined based on the results of the evaluation of the contextual information against the connection rules database 156.

Figure 4:
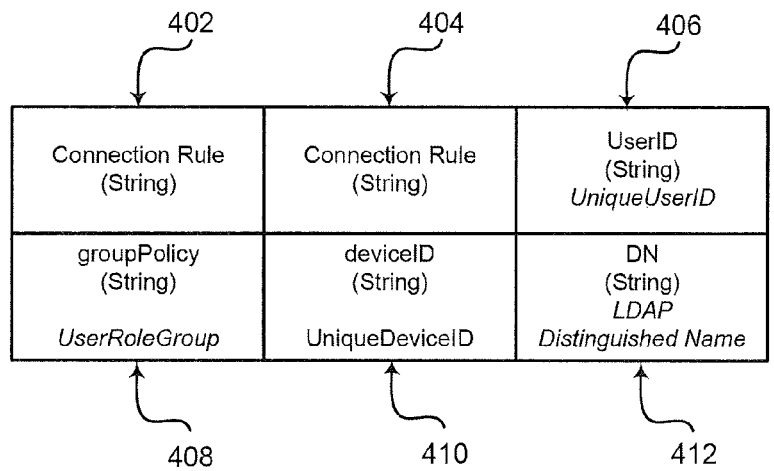
FIG. 4 shows a data structure a network connection object that is dynamically generated by a directory server as a result of an authorization process according to an embodiment of the invention.

In one embodiment of the invention, the data contained in an authorization result dynamically generated by the access request evaluation engine 152 can be encoded using a data structure as shown in FIG. 4. In particular, FIG. 4 illustrates a data structure 400 of a connection state object according to an embodiment of the invention. The data structure 400 comprises a plurality of data blocks 402, 404, 406, 408, 410, and 412. The data blocks 402 and 404 include data in string format that specifies various connection rules that are to be applied to a network connection as authorized.

In one embodiment, the connection rules specified in blocks 402 and 406 may include firewall rules. For instance, a firewall rule may be a rule that specifies an IP address that the client application can access, or a rule that specifies which port the client application can connect to, or both. In other embodiments, the connection rules may specify network conditions. For instance, a network condition can specify a network configuration. In other embodiments of the invention, the connection rules may specify, by way of illustrative example, OSI layer 3 TCP/IP firewall restrictions, higher level application protocol restrictions (e.g. OSI layer 7 HTTP URL filtering), OSI layer 2 VLAN settings (to control access to wireless networks (e.g., a Wi-Fi network)), and OSI layer 3 TCP/IP addresses and network configuration settings (e.g. DNS in wireless connection where particular users would be assigned particular IP addresses or particular domain name servers). Other connection rules may be included which specify bandwidth constraints where one type of user may not obtain as much network bandwidth as another type of user based on priority, etc., or inactivity idle timeouts which specify that given user logged in with certain device and/or application will be disconnected from the network, after a certain idle period of time. Moreover, for virtual private network connections, a connection rule can specify a VPN split tunneling connection or a VPN full tunneling connection, whereby if a client is logged into a corporate VPN, for example, all traffic will pass through the corporate VPN (full tunneling) or certain specified traffic will not pass through the corporate VPN but go directly to a destination node (split tunneling).

The other data blocks 406, 408, 410, and 412 as shown in FIG. 4 may comprise some or all of the different types of contextual information contained in the original access request. For instance, data block 406 includes the user ID (UniqueUserID) in string format, which specifies user identification contextual information contained in the access request. Data block 408 includes a group policy (UserRole-Group) in string format which specifies user role contextual information contained in the access request. Data block 410 includes a device identifier (UniqueDeviceID) in string format, which specifies device identification contextual information contained in the access request. Moreover, in the context of an LDAP protocol, the data block 412 includes a distinguished name DN (DistinquishedName) in string format, which specifies the distinguished name applied to data records of a given user in an LDAP directory.

In other embodiments of the invention, the connection state object 400 may include other data blocks that include other types of contextual information contained in the access request (device location, date, and time of network access request, etc.). The contextual information in blocks 406, 408, 410 and 412 is included in the connection state object 400 for accounting purposes when a given session is established based on the connection rules specified in the connection state object 400. In other embodiments of the invention, the connection state object 400 may include special instructional text banners that provide, e.g., a message of the day, legal disclaimers, or other information that provides information about a given service, etc.

Referring again to FIG. 2, once the authorization result (e.g., connection state object) is dynamically generated by the access request evaluation engine 152, the authentication result and connection state object are sent to the gateway server 120 (step 214). With the target "endpoint" of the access request authenticated, the gateway server 120 will establish a network connection to the remote network 130 according to the connection rule(s) specified in the connection state object (step 215).

The systems and methods described above with reference to FIGS. 1 and 2, for example can be implemented using the systems and methods described in the above-referenced patent applications U.S. patent application Ser. No. 13/743,265, filed concurrently herewith (identified by Attorney Docket No. YOR920130027US1, entitled "Authentication in Virtual Private Networks") and U.S. patent application Ser. No. 13/095,437, for establishing secure virtual private network communications using processes executing in unprivileged user space. For example, U.S. patent application Ser. No. 13/095,437, which is incorporated herein by reference, discloses systems and methods for establishing secure VPN communications by utilizing user-mode VPN clients and user-mode network protocol stacks (e.g., TCP/IP stacks) that operate in user space to establish secure VPN connections without the need for root access to an operating system of the computing device.

Figure 5:
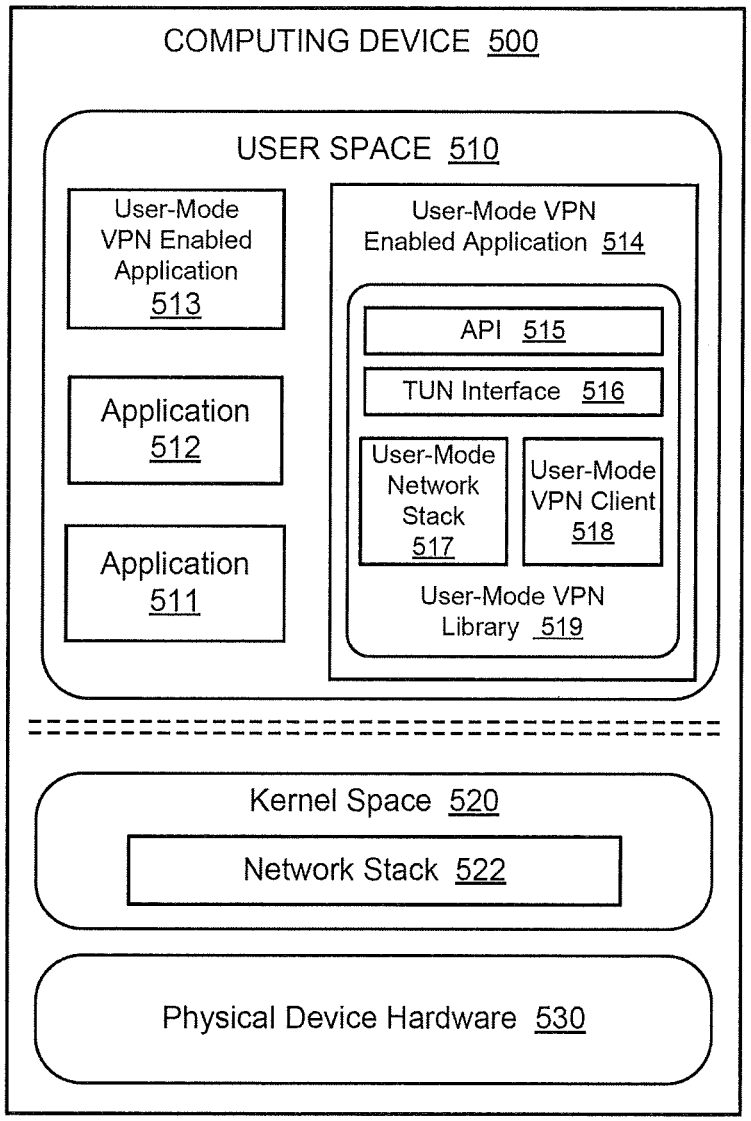
FIG. 5 is a block diagram of a computing device having a user-mode virtual private network enabled application, which can be implemented in the system of FIG. 1 to enable secure VPN communications without requiring privileged access (root access) to communication stacks executing in kernel space of the computing device, according to an embodiment of the invention.

For instance, FIG. 5 is a block diagram of a computing device having a user-mode virtual private network enabled application, which can be implemented in the system of FIG. 1 to enable secure VPN communications without requiring privileged access (root access) to communication stacks executing in kernel space of the computing device, according to an embodiment of the invention. The computing device 500 comprises a user space 510 in which a plurality of conventional applications 511 and 512 and user-mode VPN enabled applications 513 and 514 are executed. The computing device 500 comprises a kernel space 520 (device operating system) in which various modules execute including a network communications stack 522 (e.g., TCP/IP), and physical device hardware 530 controlled by the operating system. Each user-mode VPN enabled application 513 and 514 comprises a user-mode VPN library. As specifically shown in FIG. 5, the user-mode VPN enabled application 514 comprises an embedded user-mode VPN library 519. The user-mode VPN library 519 comprises program code for implementing an API (application program interface) 515, a tunneling (TUN) interface 516 (or port forwarder interface), a user-mode network communications stack 517 (e.g., user-mode TCP/IP stack) and a user-mode VPN client 518. The API 515 exposes the functionality of the various modules 516, 517, and 518 of the user-mode VPN library 519. The VPN client 518, network protocol stack 517 (e.g., TCP/IP stack), and TUN (port forwarding) interface 516 are integrated user-mode processes in non-privileged user space 510.

The VPN library 519 comprises a plurality of functions that are used to initiate, open, control and close VPN connections in non-privileged user space 510. The VPN library 519 is a portable function library that can be embedded into any application logic, rather than being stand-alone software. The VPN library 519 is compatible with many different platforms, including, but not limited to Mac OSX, iOS, UNIX/Linux and Android platforms. In one exemplary embodiment of the invention, the VPN library 519 combines the user-mode VPN client 518 and the user-mode TCP/IP network stack 517 as an integrated user-mode process in user space 510. The VPN library 519 also includes various functions to establish, disconnect, and query a VPN connectivity state. VPN network communications from remote network (e.g. Intranet) to the user-mode VPN enabled application 514 are controlled by the TUN interface 516 which reroutes secure VPN network traffic from the native network stack 522 (e.g., native TCP/IP stack), through a local loopback interface to the user-mode network stack 517 (e.g., user-mode TCP/IP stack) in user space 510 where the application 514 can access the data. VPN communications from the application 514 to the remote VPN network are written to the user-mode stack 517 in user space 510 where the VPN traffic is rerouted by the TUN interface 516 through the loopback interface to the native network stack 522. In this regard, the application 514 accesses a non-privileged network stack 517 in user space 510 where the application does not need root access to the operating system in kernel space 520.

The embodiment shown in FIG. 5 supports a VPN framework in which VPN communications occur exclusively within a single process running in the application layer, wherein such communication do not require privileged access to the operating system, and wherein the VPN communications are implemented on a per application basis for each user-mode VPN enabled application operation on a given computing device. The user-mode VPN framework enables a unique method for authenticating and authorizing VPN connectivity requests in the system of FIG. 1 on a finer granularity of authentication criteria based on contextual information associated with the user, the computing device, as well as the client application requesting VPN connectivity. The additional granularity enables a novel ability to provide authentication and authorization in the system of FIG. 1 on a fine-grained application/user/device specific basis, such as explained in greater detail in the above-referenced patent application U.S. patent application Ser. No. 13/743, 265, filed concurrently herewith (identified by Attorney Docket No. YOR920130027US1, entitled "Authentication in Virtual Private Networks").

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1, 2, 3, 4 and 5 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 6:
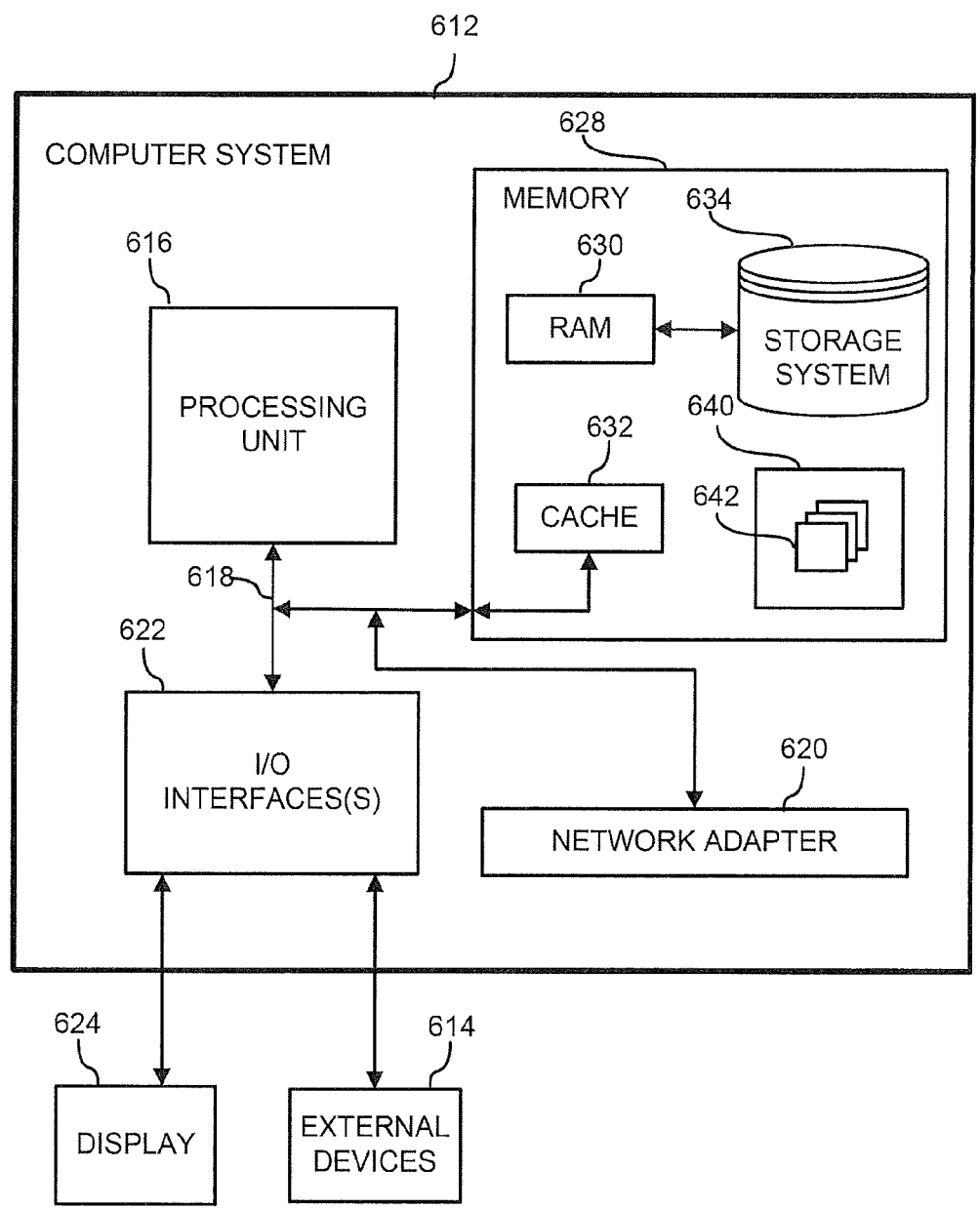
FIG. 6 illustrates a computer system in accordance with which one or more components/steps of the techniques of the invention may be implemented, according to an embodiment of the invention.

One or more embodiments can make use of software running on a general-purpose computer or workstation. With reference to FIG. 6, in a computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

The bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 612 typically includes a variety of computer system readable media. Such media may be any available media that is accessible by computer system/server 612, and it includes both volatile and non-volatile media, removable and non-removable media.

The system memory 628 can include computer system readable media in the form of volatile memory, such as random access memory (RAM) 30 and/or cache memory 632. The computer system/server 612 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 618 by one or more data media interfaces. As depicted and described herein, the memory 628 may include at least one program product having a set (e.g., at least one) of program modules that are configured to carry out the functions of embodiments of the invention. A program/utility 440, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc., one or more devices that enable a user to interact with computer system/server 612, and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for controlling access to a network, comprising:
    receiving, by a gateway server, an access request from a client application running on a computing device for accessing a remote network, wherein the access request comprises a username and a user password as contextual information for use in authorizing access to the remote network,
        wherein the access request comprises at least one of a first type of access request and a second type of access request, wherein the username associated with said first type of access request includes a user identifier, and wherein the username associated with said second type of access request includes a user identifier in combination with other contextual information, wherein the other contextual information comprises contextual information about the computing device and the client application requesting access to the remote network;
    submitting, by the gateway server, an authorization query to a directory server, wherein the authorization query comprises the contextual information contained in the access request received from the client application to access the remote network;
    receiving, by the gateway server, an authorization result from the directory server in response to the authorization query, the authorization result being dynamically generated in real-time by the directory server based on a determination by the directory server as to the type of access request associated with the submitted authorization query,
        wherein for the first type of access request, the authorization result indicates whether the user is authorized to access the remote network based on an evaluation of the user identifier and the user password included in the submitted authorization query, and
        wherein for the second type of access request, the authorization result is generated by evaluating the user identifier in combination with the other contextual information included in the submitted authorization query using one or more network connection rules, wherein the authorization result comprises a connection object comprising a network connection rule which specifies at least one rule to be applied by the gateway server to establish a network connection between the client application and the remote network based on the user identifier in combination with the other contextual information;
    establishing, by the gateway server, a network connection between the client application and the remote network, when a successful authorization result is generated in response the first type of access request; and
    establishing, by the gateway server, a network connection between the client application and the remote network in accordance with the network connection rule, when a successful authorization result is generated in response the second type of access request.

2. The method of claim 1, wherein the directory server comprises an LDAP (Lightweight Directory Access Protocol) server, and wherein in response to a first type of access request, the directory server performs a BIND process and a SEARCH process using the username and user password to authenticate the user and to determine if the user is authorized to access the remote network.

3. The method of claim 1, wherein submitting an authorization query to a directory server further comprises submitting an authentication request to the directory server to authenticate an identity of an endpoint, wherein the endpoint comprises one of the user, the computing device, the client application or a combination thereof.

4. The method of claim 1, wherein the connection object is a data structure comprising a plurality of data blocks, wherein a first data block comprises the network connection rule, wherein a second data block comprises at least a portion of the contextual information of the access request.

5. The method of claim 1, wherein the network connection rule comprises a firewall rule.

6. The method of claim 5, wherein the firewall rule comprises one of a rule that specifies an IP address that the client application can access and a rule that specifies which port the client application can connect to or both.

7. The method of claim 1, wherein the network connection rule comprises a network condition.

8. The method of claim 7, wherein the network condition specifies a network configuration.

9. The method of claim 1, wherein the contextual information about the client application comprises an application identifier.

10. The method of claim 1, wherein the contextual information about the client application identifies an application type of the client application.

11. The method of claim 1, wherein the user identifier and the user password comprise contextual information about the user.

12. The method of claim 1, wherein the contextual information further comprises a role of the user.

13. The method of claim 1, wherein the contextual information about the computing device comprises a device identifier that identifies a device type of the computing device.

14. The method of claim 1, wherein the contextual information about the computing device comprises information regarding an operating system of the computing device.

15. The method of claim 1, wherein the contextual information about the computing device comprises location information regarding a location of the computing device.

16. The method of claim 1, wherein the contextual information further comprises connection information regarding a type of network connection.

17. The method of claim 1, wherein the contextual information further comprises information regarding a date or time of day or both of the access request.

18. A method of using a directory service to control access to network, comprising:
  receiving, by a directory server, an authorization query from a gateway server, wherein the authorization query comprises a username and a user password as contextual information contained in an access request received by the gateway server from a client application running on a computing device requesting access to a remote network,
    wherein the access request comprises at least one of a first type of access request and a second type of access request, wherein the username associated with said first type of access request includes a user identifier, and wherein the username associated with said second type of access request includes a user identifier in combination with other contextual information, wherein the other contextual information comprises contextual information about the computing device and the client application requesting access to the remote network;
  determining, by the directory server, the type of access request associated with the received authorization query;
  performing, by the directory server, an authorization process based on the determined type of access request,
    wherein for the first type of access request, the authorization process comprises evaluating the user identifier and the user password included in the received authorization query to determine whether the user is authorized to access the remote network, and
    wherein for the second type of access request, the authorization process comprises evaluating the user identifier in combination with the other contextual information included in the received authorization query using one or more network connection rules, wherein the network connection rules specify different rules by which the gateway server can establish a network connection between the client application and the remote network based on the user identifier in combination with the other contextual information;
  dynamically generating, by the directory server, an authorization result in real-time based on results of the evaluation of the contextual information,
    wherein for the first type of access request, the authorization result indicates whether the user is authorized to access the remote network based on the user identifier and the user password, and
    wherein for the second type of access request, the authorization result comprises a connection object comprising a network connection rule which specifies at least one rule to be applied by the gateway server to establish a network connection between the client application and the remote network based on the user identifier in combination with the other contextual information;
  sending, by the directory server, the authorization result to the gateway sever as a response to the authorization query to authorize the gateway server to establish a network connection between the client application and the remote network, when a successful authorization result is generated in response to the first type of access request; and
  sending, by the directory server, the authorization result comprising the connection object to the gateway sever as a response to the authorization query to authorize the gateway server to establish a network connection between the client application and the remote network in accordance with the network connection rule, when a successful authorization result is generated in response to the second type of access request.

19. The method of claim 18, wherein the directory server comprises an LDAP (Lightweight Directory Access Protocol) server, and wherein in response to a first type of access request, the directory server performs a BIND process and a SEARCH process using the username and user password to authenticate the user and to determine if the user is authorized to access the remote network.

20. The method of claim 18, wherein receiving an authorization query from a gateway server further comprises receiving an authentication request from the gateway server to authenticate an identity of an endpoint, wherein the endpoint comprises one of the user, the computing device, the client application or a combination thereof, wherein the method further comprises performing an authentication process to authenticate an identity of the endpoint using the contextual information contained in the authorization query and directory information accessed by the directory server.

21. The method of claim 20, further comprising verifying the identity of the endpoint using secondary data from one or more remote or local data sources other than the directory information.

22. The method of claim 18, wherein the network connection rule comprises a firewall rule.

23. The method of claim 22, wherein the firewall rule comprises one of a rule that specifies an IP address that the client application can access and a rule that specifies which port the client application can connect to or both.

24. The method of claim 18, wherein the network connection rule comprises a network condition.

25. The method of claim 24, wherein the network condition specifies a network configuration.

26. The method of claim 18, wherein the contextual information about the client application comprises an application identifier.

27. The method of claim 18, wherein the contextual information about the client application identifies an application type of the client application.

28. The method of claim 18, wherein the contextual information about the computing device comprises a device identifier that identifies a device type of the computing device.

29. The method of claim 18, wherein the contextual information about the computing device comprises location information regarding a location of the computing device.

30. The method of claim 18, wherein the contextual information further comprises information regarding a date or time of day or both of the access request.

* * * * *